US009449529B2

(12) United States Patent
Brown et al.

(10) Patent No.: US 9,449,529 B2
(45) Date of Patent: Sep. 20, 2016

(54) EDUCATIONAL DINNERWARE DEVICE

(71) Applicants: Billy J. Brown, Fenton, MI (US); Lina C. Brown, Fenton, MI (US)

(72) Inventors: Billy J. Brown, Fenton, MI (US); Lina C. Brown, Fenton, MI (US)

(73) Assignee: BJTCB, INC., Fenton, MI (US)

( * ) Notice: Subject to any disclaimer, the term of this patent is extended or adjusted under 35 U.S.C. 154(b) by 357 days.

(21) Appl. No.: 14/056,121

(22) Filed: Oct. 17, 2013

(65) Prior Publication Data
US 2014/0106314 A1 Apr. 17, 2014

Related U.S. Application Data

(60) Provisional application No. 61/714,854, filed on Oct. 17, 2012.

(51) Int. Cl.
*A47G 19/02* (2006.01)
*G09B 19/00* (2006.01)

(52) U.S. Cl.
CPC ........... *G09B 19/0092* (2013.01); *A47G 19/02* (2013.01)

(58) Field of Classification Search
CPC .......................... A47G 19/00; G09B 19/0092
USPC .......................................... 434/127; 220/574
See application file for complete search history.

(56) References Cited

U.S. PATENT DOCUMENTS

| 2,514,094 A | 7/1950 | Rubin |
| 2,781,650 A | 2/1957 | Lee |
| 2,861,367 A | 11/1958 | Chanslor |
| 2,985,333 A * | 5/1961 | Kirkman ................ A47B 88/20 220/533 |
| 3,255,544 A | 6/1966 | Bornholt |
| 3,514,887 A * | 6/1970 | Jacob .................... A47G 19/025 40/324 |
| 3,515,262 A | 6/1970 | Ornstein et al. |
| 3,935,656 A | 2/1976 | Pritchard |
| 4,047,633 A | 9/1977 | Trombly |
| 4,263,734 A | 4/1981 | Bradshaw |
| 4,655,715 A | 4/1987 | Van de Carr et al. |
| 4,679,691 A | 7/1987 | Halloran |
| 4,837,954 A | 6/1989 | Shultz |
| 4,936,462 A | 6/1990 | Yuen |
| 5,095,641 A | 3/1992 | Dahl |
| 5,150,804 A * | 9/1992 | Blanchet ................ B65D 51/24 206/505 |
| 5,191,979 A | 3/1993 | Nemeroff |
| 5,301,802 A | 4/1994 | Nemeroff |

(Continued)

OTHER PUBLICATIONS

"MIU France Brushed Stainless Steel Paper Napkin Holder," MIU France, http://www.amazon.com/MIU-France-Brushed-Stainless-Napkin/dp/B0000DZCJ5/ref=sr_1_2?ie=UTF8&qid=1445194684&sr=8-2&keywords=flat+napkin+holder+with+weighted+bar, Dec. 19, 2003.*

*Primary Examiner* — Robert J Utama
*Assistant Examiner* — Jennifer L Korb
(74) *Attorney, Agent, or Firm* — Warn Partners, P.C.

(57) ABSTRACT

An educational dinnerware device has an interior surface connected to a rim. The interior surface has at least one interior side wall and a bottom surface defining a food area. An exterior surface of the educational dinnerware device is connected to and extends away from the rim and has at least one exterior side wall and an exterior bottom surface. Formed in the exterior bottom surface is a card loading cavity with an exterior viewing surface forming a wall of the card loading cavity. A viewing card having two opposite viewing surfaces and an edge is placed in the card viewing cavity and allows one of the surfaces of the viewing card to be viewed through the exterior viewing surface, which can be viewed through the interior viewing surface of the educational dinnerware device.

17 Claims, 8 Drawing Sheets

(56) References Cited

U.S. PATENT DOCUMENTS

| | | |
|---|---|---|
| 5,367,803 A | 11/1994 | Albin |
| 5,729,922 A | 3/1998 | Peterson et al. |
| 6,464,222 B1 | 10/2002 | Parker |
| 6,648,715 B2 * | 11/2003 | Wiens ............ A63H 33/062 446/121 |
| 6,960,171 B2 | 11/2005 | Sanders |
| 7,059,491 B1 | 6/2006 | Smith |
| 7,064,857 B2 | 6/2006 | Parker et al. |
| 7,093,832 B2 | 8/2006 | Parker |
| 7,247,492 B2 | 7/2007 | Smith |
| 7,437,841 B2 | 10/2008 | Thum |
| 7,536,767 B2 | 5/2009 | Hollis et al. |
| 7,552,841 B2 | 6/2009 | Hollis et al. |
| 7,610,703 B2 | 11/2009 | Thum |
| 7,637,388 B2 | 12/2009 | Schantz et al. |
| 7,673,750 B1 | 3/2010 | Huckert |
| 7,694,843 B2 | 4/2010 | Hollis et al. |
| 7,704,347 B2 | 4/2010 | Hollis et al. |
| 7,814,647 B2 | 10/2010 | Hollis et al. |
| 7,818,866 B2 | 10/2010 | Hollis et al. |
| 7,918,005 B2 | 4/2011 | Hollis et al. |
| 7,918,016 B2 | 4/2011 | Hollis et al. |
| 8,087,147 B2 | 1/2012 | Hollis et al. |
| 2002/0079317 A1 * | 6/2002 | Scott ............ A47G 19/025 220/574 |
| 2003/0041489 A1 | 3/2003 | Murphy et al. |
| 2004/0060212 A1 | 4/2004 | Murphy et al. |
| 2007/0151977 A1 * | 7/2007 | Casale ............ A47G 19/025 220/574 |
| 2009/0321455 A1 | 12/2009 | Fernandez et al. |

* cited by examiner

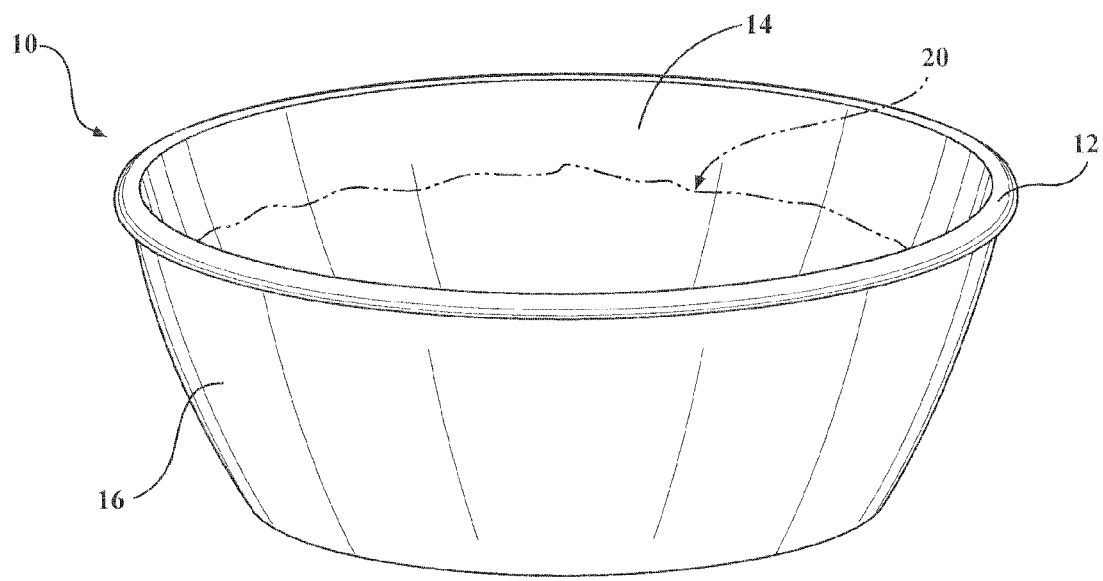
FIG. 1
FIG. 2
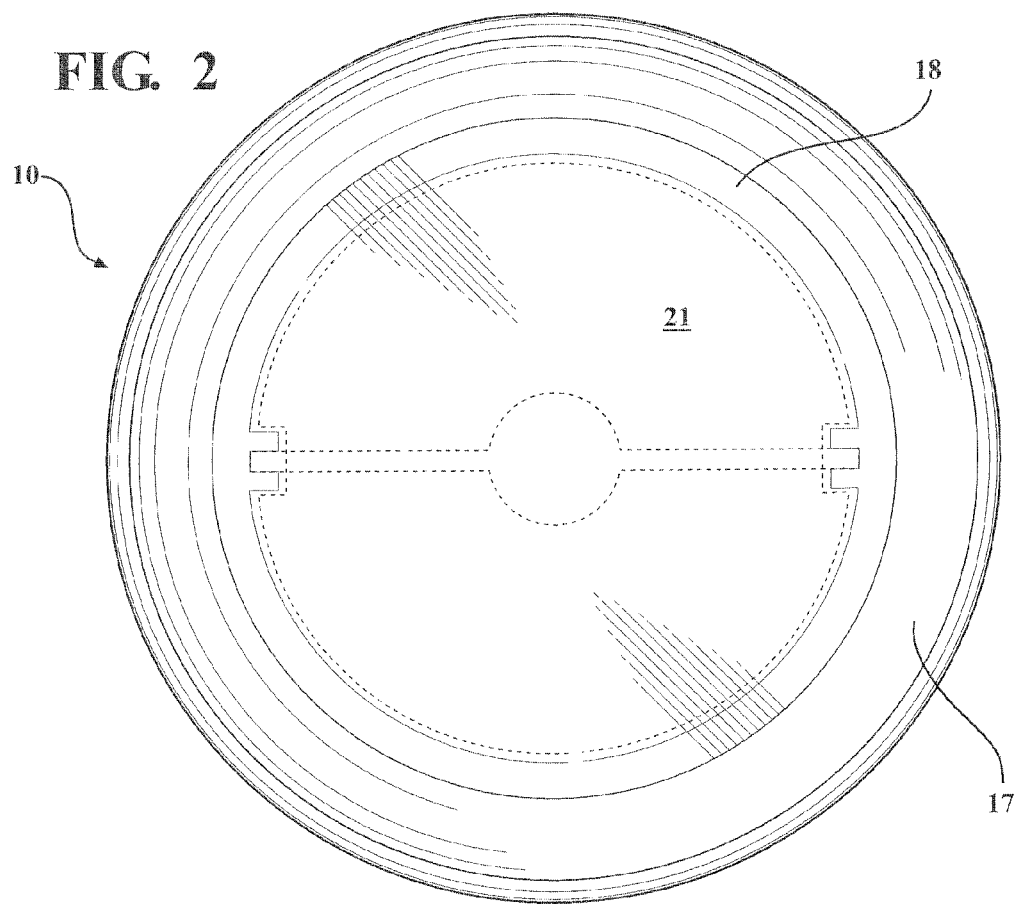

EDUCATIONAL DINNERWARE DEVICE

CROSS-REFERENCE TO RELATED APPLICATIONS

This application claims the benefit of U.S. Provisional Application No. 61/714,854, filed Oct. 17, 2012.

FIELD OF THE INVENTION

The present invention relates to an educational dinnerware device.

BACKGROUND OF THE INVENTION

The present invention applies to the fields of children's dinnerware and educational devices. More particular the present invention is used as a dual purpose device with attributes in both these technical categories.

A persistent problem parents and guardians of children face is encouraging their children to complete the meals placed before them. Utensils such as drinking glasses, cups and dishes have been decorated with a wide variety of pictorial illustrations and textual materials which, hopefully capture the interest of the child and encourage the child to eat the food in the dinnerware. However, the pictures and textural materials never change and cannot be customized. Therefore, it is therefore an important object of the invention to provide a child's feeding dinnerware wherein visual or textual material appearing at the bottom of the utensil may be changed from time to time in order to increase the interest of the child in uncovering such material.

A further object of the invention is to provide an educational dinnerware device including interchangeable visual matter in the bottom thereof and having a construction which is economically fabricated, easy to use and readily cleaned.

SUMMARY OF THE INVENTION

The present invention is an educational dinnerware device with the dual purposes of being used as an educational/entertainment device. The educational dinnerware device has an interior surface connected to a rim. The interior surface has at least one interior side wall and a bottom surface defining a food area. An exterior surface of the educational dinnerware device is connected to and extends away from the rim and has at least one exterior side wall and an exterior bottom surface.

Formed in the exterior bottom surface is a card loading cavity with an exterior viewing surface forming a wall of the card loading cavity. A viewing card having two opposite viewing surfaces and an edge is placed in the card viewing cavity and allows one of the surfaces of the viewing card to be viewed through the exterior viewing surface, which can be viewed through the interior viewing surface of the educational dinnerware device.

At least two wedges are formed within the card loading cavity. The viewing card edge has at least two notches that are configured to align and press fit onto one of the at least two wedges. A resilient locking bar extends across a portion of the viewing card and has at least two ends. Each one of the at least two ends are configured to press fit into one of the at least two wedges for holding the viewing card within the card loading cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is an angled side top perspective view of an educational dinnerware device in accordance with a first or second or third embodiment of the invention;

FIG. 2 is a top plan view of the educational dinnerware device in accordance with the first embodiment of the invention;

DETAILED DESCRIPTION OF THE PREFERRED EMBODIMENTS

Figure 3:
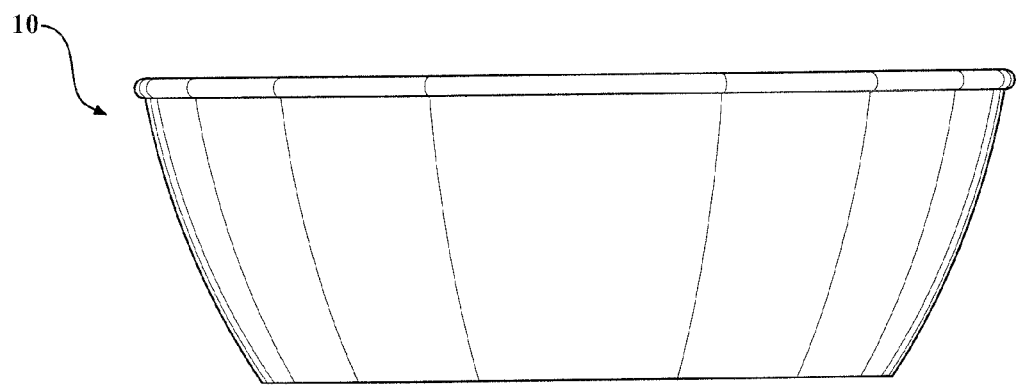
FIG. 3 is a side view of the educational dinnerware device in accordance with a first or second or third embodiment of the invention.

The following description of the preferred embodiment(s) is merely exemplary in nature and is in no way intended to limit the invention, its application, or uses.

Referring now to the drawings of the application, an educational dinnerware device 10, 10', 10'''is shown. The educational dinnerware device 10 has a rim 12 that is connected to both an interior surface 14 and exterior surface 16 of the educational dinnerware device 10. The educational dinnerware device 10 is shown as a bowl; however, it is within the scope of this invention for the educational dinnerware device 10 to be a cup, plate or any other suitable device for holding and consuming food. The interior surface 14 has an interior side wall 17 connected to the rim 12 and a bottom surface 18. The interior side wall 17 and bottom surface 18 are connected and integral with each other and define a food area 20 for receiving and holding food. The bottom surface 18 has an interior viewing surface 21 that is a transparent window for viewing through the interior surface 14. The interior viewing surface 21 can be a portion of the bottom surface 18 or it can be the entire bottom surface 18. Additionally, the interior viewing surface 21 can encompass both the bottom surface 18 and a portion of the interior side wall 16 depending upon the particular application.

The exterior surface 16 of the educational dinnerware device 10 has at least one exterior side wall 22 connected to the rim 12 and an exterior bottom surface 24 connected to the at least one exterior side wall 22. As shown in the drawings, the interior surface 14 and exterior surface 16 are in the shape of a circular bowl; however, it is within the scope of this invention for the interior surface 14 and exterior surface 16 to take other shapes such as squares, rectangles, triangles or any other desired shape for the educational dinnerware device 10.

The exterior bottom surface 24 has a protruding ring 26 that is used to define a card loading cavity 28 formed into the exterior bottom surface 24 of the exterior surface 16. The protruding ring 26 is used to stabilize the educational dinnerware device 10 when placed on a surface and the use of the protruding ring 26 is an optional feature of the invention. In the present embodiment of the invention, the protruding ring 26 defines the card loading cavity 28. The card loading cavity 28 has an exterior viewing surface 30 that aligns with the interior viewing surface 21 so that an object, or in the present case, a viewing card 32 placed within the card loading cavity 28 can be viewed when looking through the interior viewing surface 21.

Figure 9:
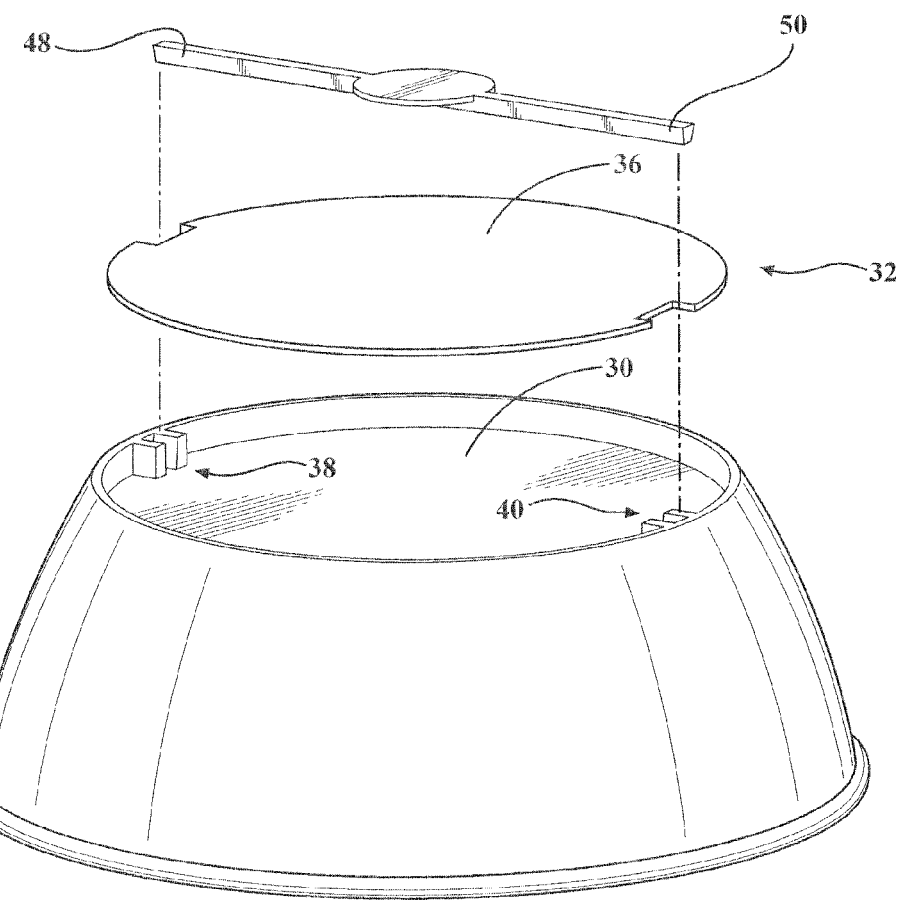
FIG. 9 is an exploded bottom side perspective view of the educational dinnerware device.
Figure 10:
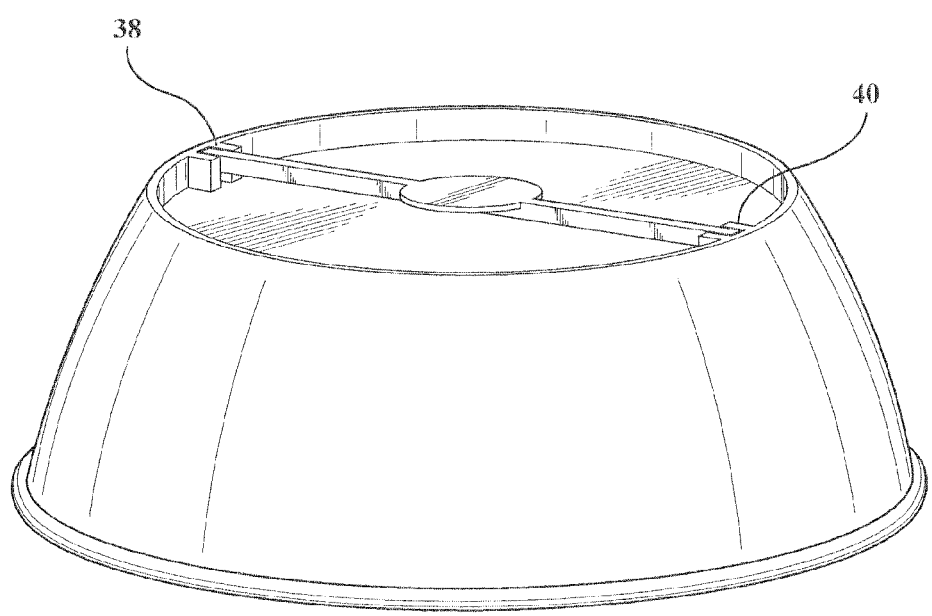
FIG. 10 is a bottom side perspective view of the educational dinnerware device.
Figure 11:
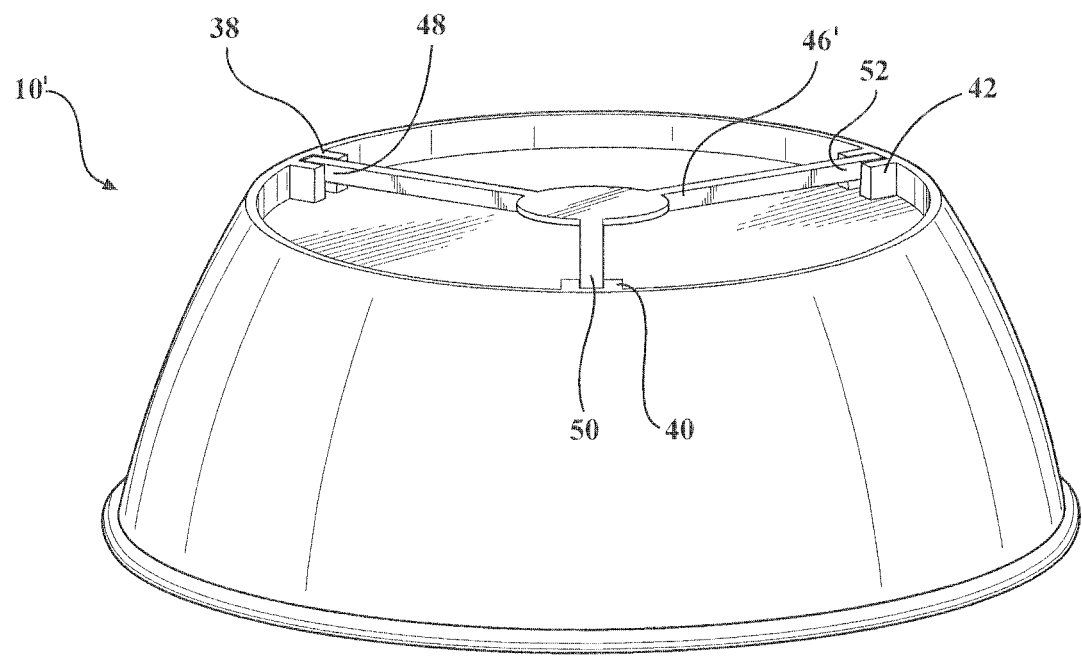
FIG. 11 is an angled side perspective bottom view of the educational dinnerware device in accordance with a second embodiment of the invention.
Figure 12:
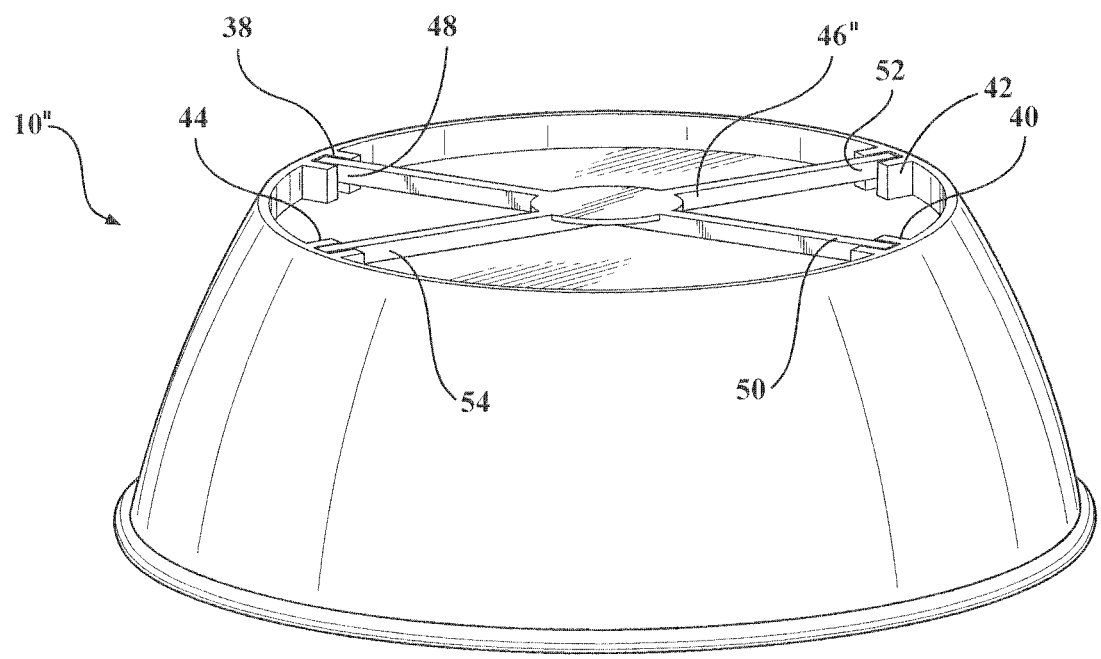
FIG. 12 is an angled side perspective bottom view of the educational dinnerware device in accordance with a third embodiment of the invention.

The card loading cavity 28 has at least two wedges 34 formed within the card loading cavity 28 and extending from the exterior viewing surface 30. The viewing card 32 has two opposite viewing surfaces 36 and an edge 37 that has at least two notches 39 that are configured to press-fit onto one of the at least two wedges 34. The wedges 34 and the press-fit help to align the viewing 32 with the exterior viewing surface 30 and prevent the viewing card 32 from moving within the card loading cavity 28. At least two wedges 34 are shown; however, it is within the scope of this invention for more wedges to be used. For example, one embodiment of the invention shown in FIGS. 9 and 10 a first wedge 38, a second wedge 40 is shown. FIG. 11 shows a third wedge 42 and FIG. 12 shows an embodiment with a fourth wedge 44.

A resilient locking bar 46 shown in FIGS. 2, 4 and 6-10 extends across the card loading cavity 28 and has a first end 48 and second end 50 that are configured to press-fit into the first wedge 38 and second wedge 40 respectively. In the embodiment of the invention shown in FIG. 11 the educational dinnerware device 10" has a resilient locking bar 46' with a "Y" shape and has a third end 52 that press-fits into the third wedge 42. In the embodiment shown in FIG. 12 the educational dinnerware device 10'" has a resilient locking bar 46" with an "X" shape and has a fourth end 54 that press-fits onto a fourth wedge 44. The resilient locking bars 46, 46', 46" serve the purpose of holding the viewing card 32 in place within the card loading cavity 28. The resilient locking bar 46, 46', 46" has two or more protrusions 56 (shown in FIG. 8) that are used to press into the surface of the viewing card 32 and hold the viewing card 32 in place.

Figure 5:
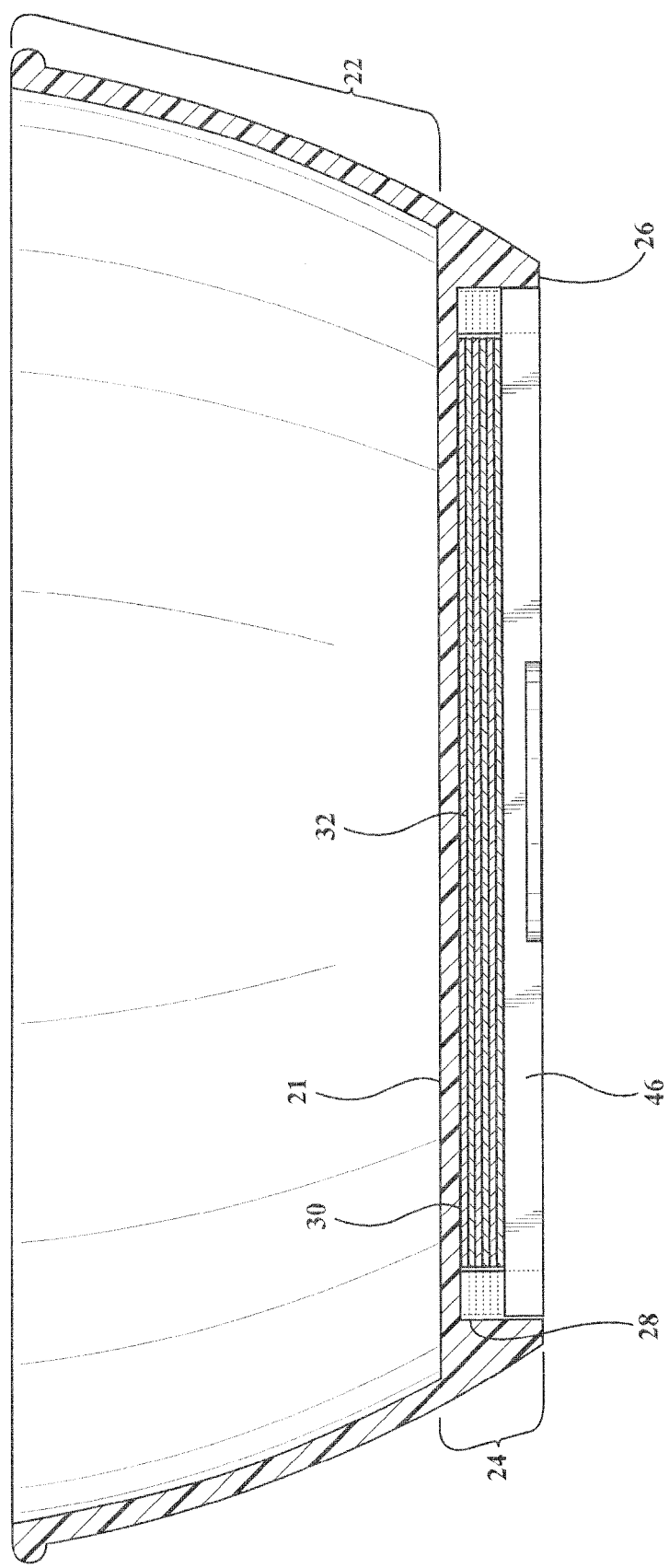
FIG. 5 is a side cross-sectional view of the educational dinnerware device.
Figure 6:
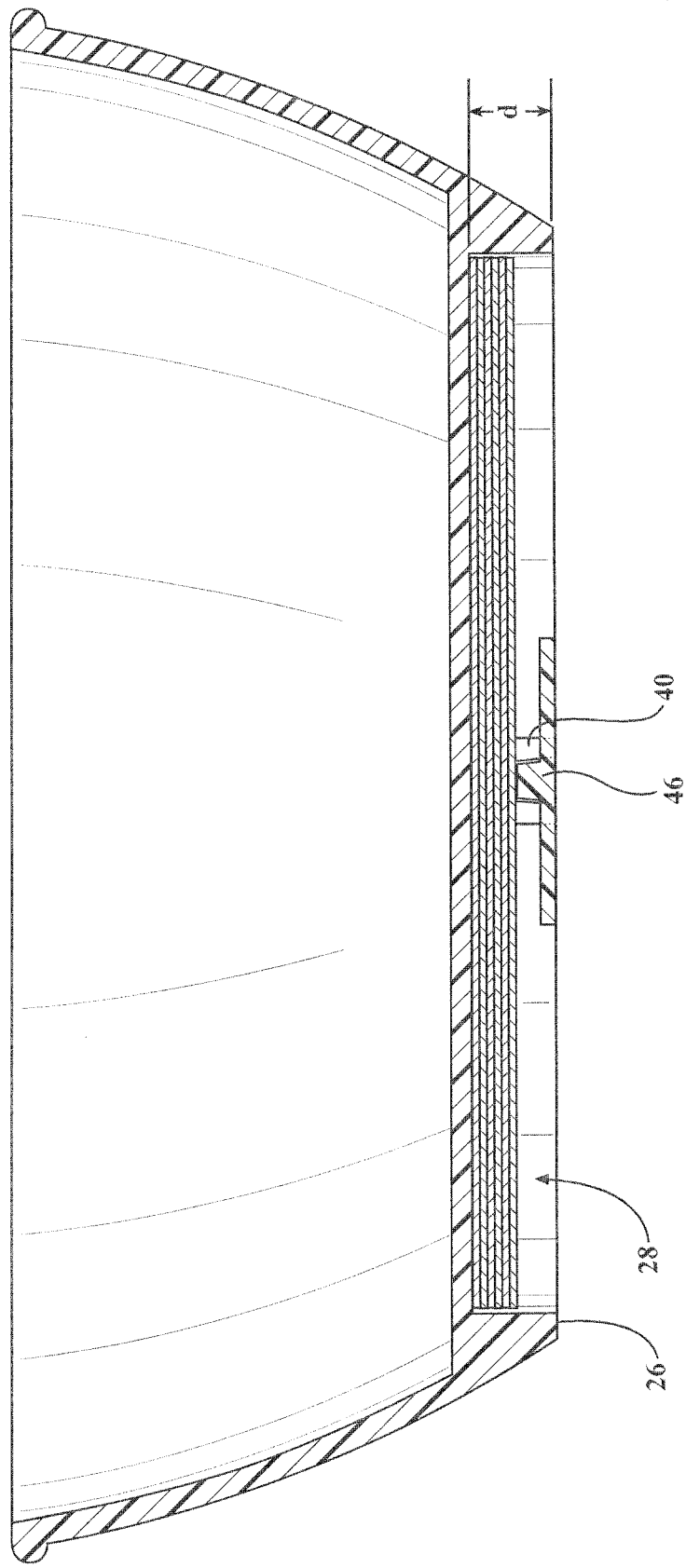
FIG. 6 is a side cross-sectional view of the educational dinnerware device.
Figure 7:
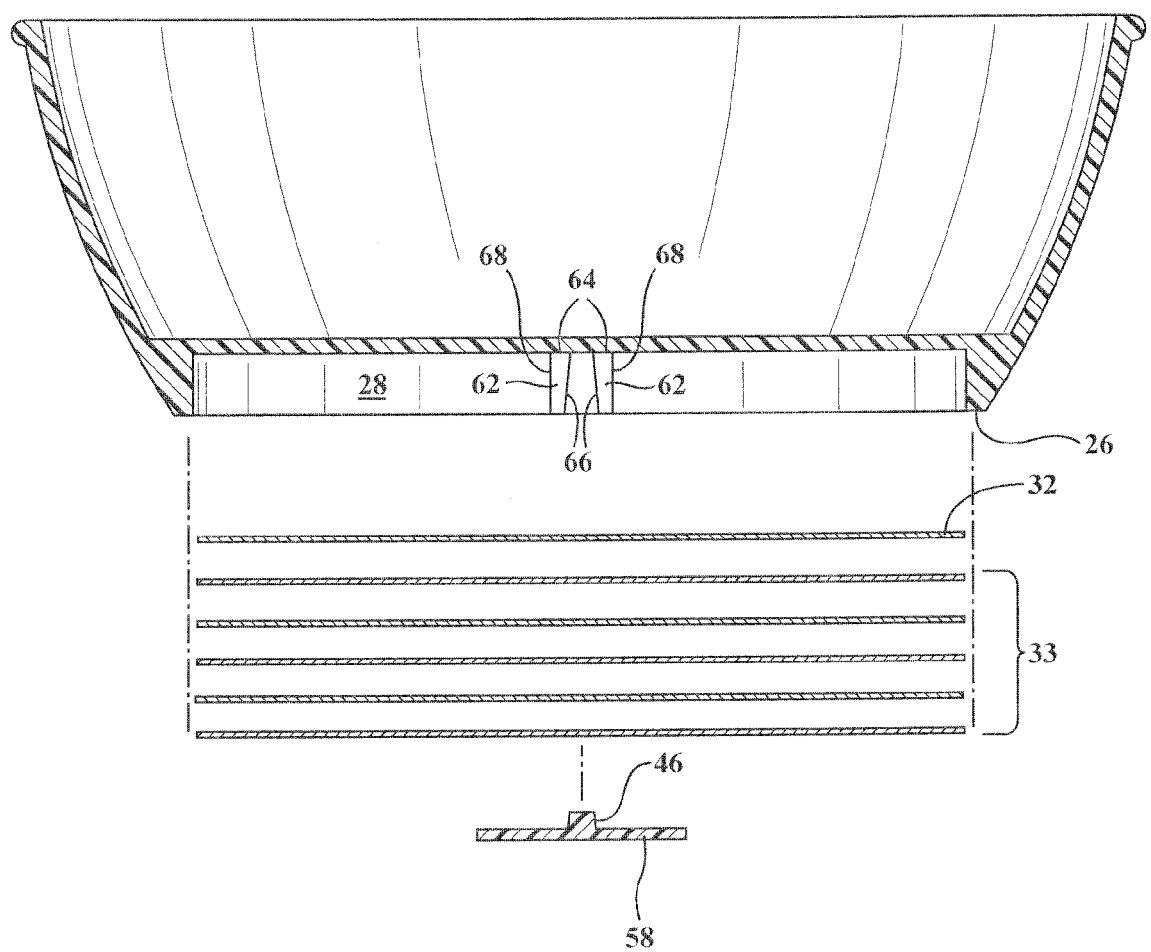
FIG. 7 is an exploded cross-sectional side view of the educational dinnerware device.
Figure 8:
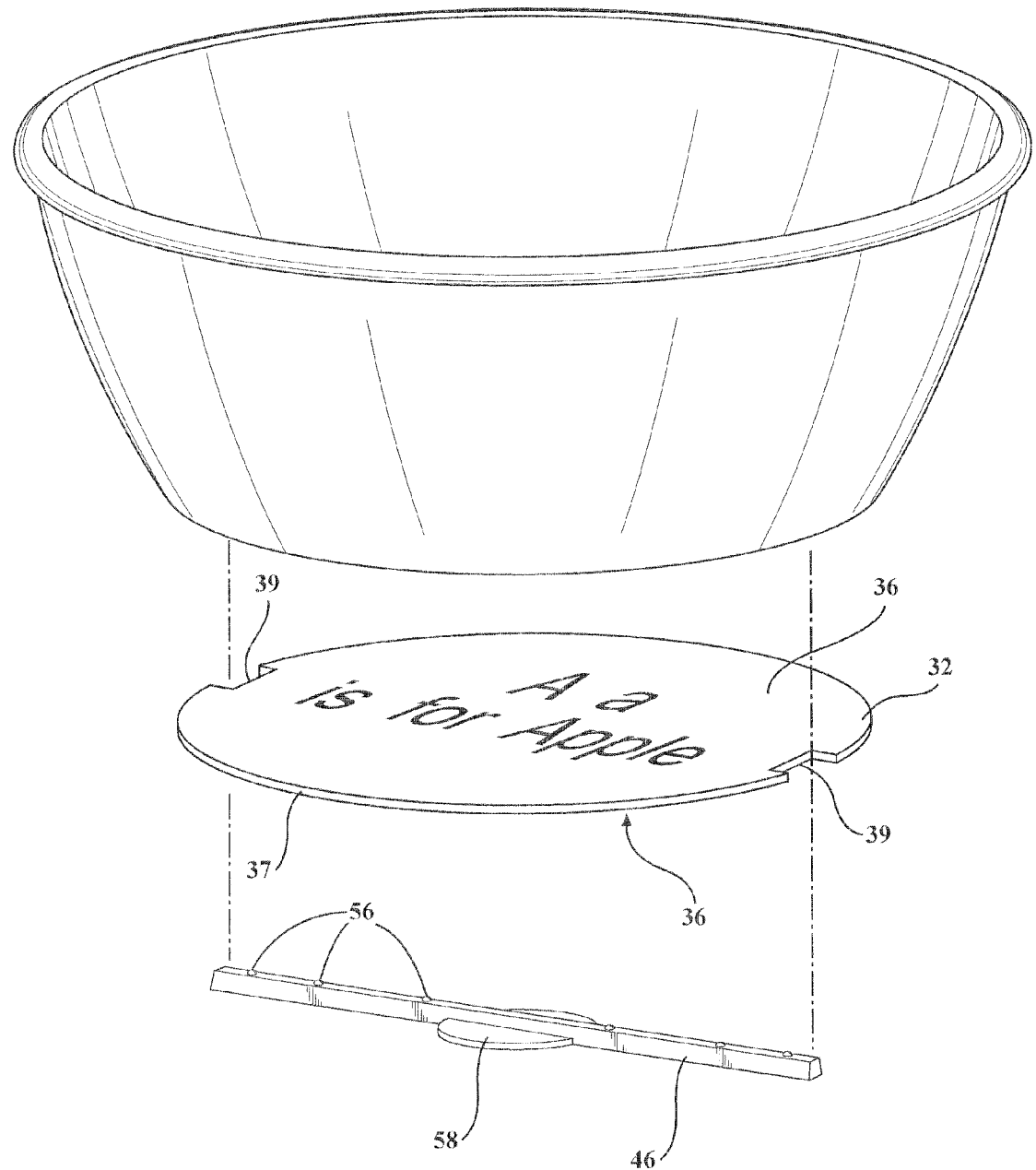
FIG. 8 is an exploded top side perspective view of the educational dinnerware device.

The card loading cavity 28 has a depth "d" defined by the protruding ring 26 that allows for additional viewing cards 33 to be placed adjacent (or underneath as shown in FIGS. 5-7) the viewing card 32 and stored within the card loading cavity 28. The locking bar 46, 46', 46" has a press-fit that is adjustable to accommodate and hold the additional viewing cards 33.

Figure 4:
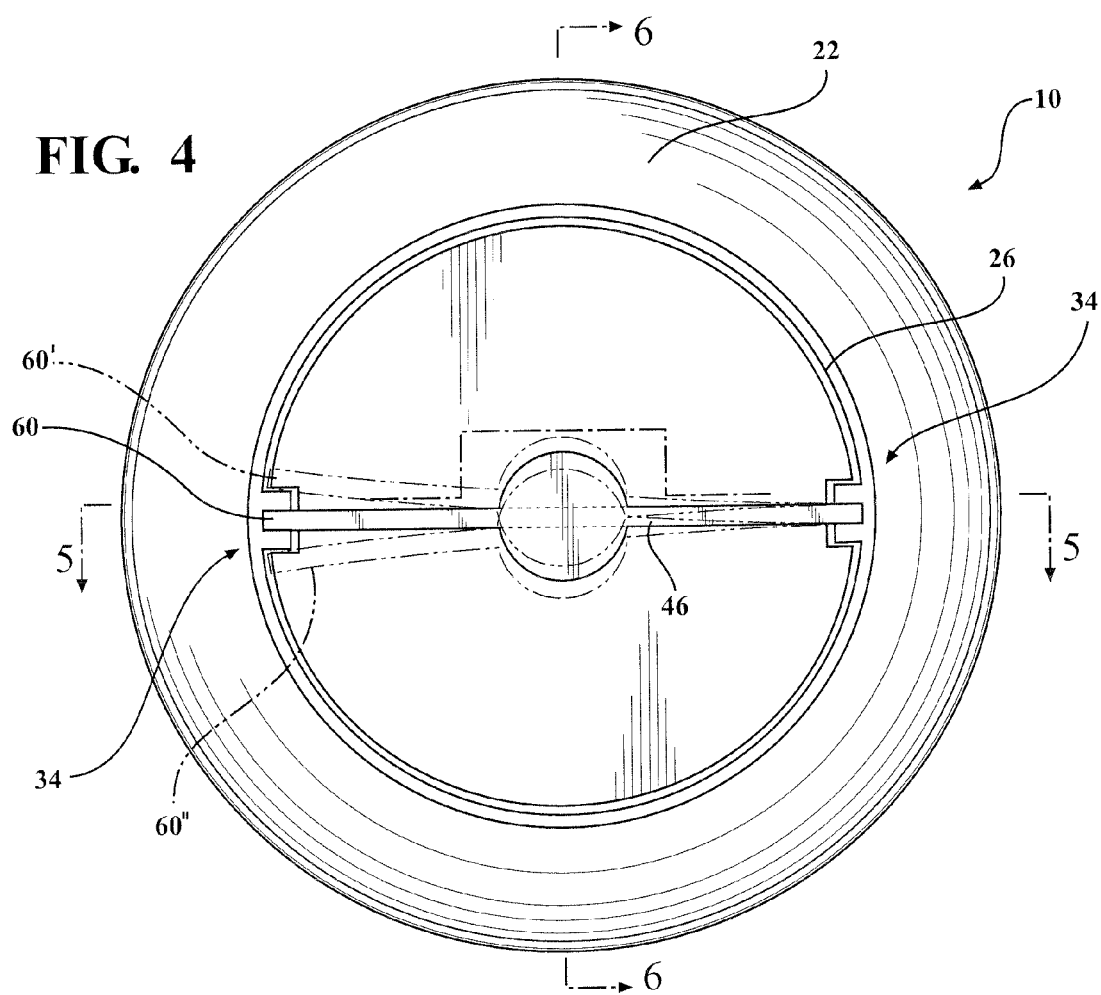
FIG. 4 is a bottom plan view of the educational dinnerware device.

The locking bar 46, 46', 46" further includes a handle 58 that is used to pull the locking bar 46, 46', 46" from its press-fit with the respective first wedge 38, second wedge 40, third wedge 42 and fourth wedge 44. The first end 48, second end 50, third end 52 and fourth end 54 of the locking bar 46, 46', 46" are bendable and resilient because the locking bar 46, 46', 46" is made out of resilient plastic material. The resiliency of the locking bar 46, 46', 46" allows the locking bar 46, 46', 46" to move between three locking positions 60, 60', 60" on each one of the first wedge 38, second wedge 40, third wedge 42 or fourth wedge 44. This is shown in FIG. 4 using the locking bar 46; however, all of the locking bars 46, 46', 46" can be moved between the three locking positions 60, 60', 60". Each of the wedges 38, 40, 42, 44 have two parallel nubs 62 that are trapezoidal in shape. A long side 64 of the trapezoid is formed on the exterior viewing surface 30. The two parallel nubs 62 are spaced apart from each other and inside angled side 66 that angle away from each other to create a wedge shape there between the two parallel nubs 62. The two parallel nubs 62 also have outside angled sides 68 that angle toward their respective inside angled sides 66 of each individual nub of the two parallel nubs 62. The inside angled sides 66 and outside angled side 68 provide an angled surface for the ends 48, 50, 52, 54 of the resilient locking bar 46, 46', 46" to press-fit onto and define the three locking positions 60, 60', 60".

In the embodiment shown in FIG. 4 the resilient locking bar 46 has only the first end 48 and the second end 50. In this embodiment, the first end 48 can hold the resilient locking bar 46 at one of the three locking positions 60, 60', 60" provided that the second end 50 of the resilient locking bar 46 is placed between the two parallel nubs 62 of the second wedge 40.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An educational dinnerware device comprising:
a rim;
an interior surface connected to the rim, wherein the interior surface has at least one interior side wall and a bottom surface defining a food area;
an exterior surface connected to and extending away from the rim said exterior surface having at least one exterior side wall and an exterior bottom surface;
a card-loading cavity formed into the exterior bottom surface;
an exterior viewing surface forming a wall of the card-loading cavity;
at least two wedges formed within said card-loading cavity, wherein said at least two wedges each have an inside angle side and an outside angle side;
a viewing card having two opposite viewing surfaces and an edge, wherein said edge has at least two notches, wherein each one of said at least two notches is configured to align and press fit onto one of said at least two wedges;
a resilient locking bar extending across a portion of the viewing card, said locking bar having at least two ends, wherein one end of said at least two ends is configured to press fit into one of said at least two wedges for holding said viewing card within the card-loading cavity and the inside angle side and outside angle side of each of the at least two wedges provide three lock positions for a second end of said at least two ends is press-fit onto; and
an interior viewing surface formed in the interior surface of the food area, wherein the interior viewing surface is aligned with the exterior viewing surface allowing the viewing card to be viewed through the interior viewing surface.

2. The educational dinnerware device of claim 1, wherein the resilient locking bar has two or more protrusions on a surface that contact and press into the viewing card.

3. The educational dinnerware device of claim 1, wherein the resilient locking bar further comprises a handle that extends parallel to the exterior bottom surface.

4. The educational dinnerware device of claim 1 further comprising one or more additional viewing cards placed adjacent to the viewing card within the card-loading cavity, wherein the locking bar holds the one or more additional viewing cards within the card-loading cavity.

5. The educational dinnerware device of claim 1 further comprising a protruding ring on the bottom surface that extends from the viewing surface of the card-loading cavity and defines a depth of the card-loading cavity.

6. The educational dinnerware device of claim 1, wherein the at least two wedges each have two parallel nubs spaced apart from each other and each one of the two parallel nubs has a trapezoid shape, where the long side of the trapezoid is formed on the viewing surface of the card-loading cavity and an inside angled side extending from the long side and positioned adjacent and extending away from the other inside angled side of the other one of the two parallel nubs and an outside angled side extending away from the long side on a side of the trapezoid opposite the inside angled side.

7. The educational dinnerware device of claim 6, wherein the one end of the locking bar is pressed in between the inside angled side of each of the two parallel nubs and the second end of the locking bar can be press fit onto one of the outside angled sides of a different one of the two parallel nubs of another one of the at least two wedges.

8. An educational dinnerware device comprising:
   a rim;
   an interior surface connected to the rim, wherein the interior surface has at least one interior side wall and a bottom surface defining a food area;
   an exterior surface connected to and extending away from the rim said exterior surface has at least one exterior side wall and an exterior bottom surface;
   a card-loading cavity formed into the exterior bottom surface;
   an exterior viewing surface forming a wall of the card-loading cavity;
   a first wedge formed within said card-loading cavity;
   a second wedge formed within said card-loading cavity and having an inside angle side and an outside angle side defining three lock positions;
   a viewing card having two opposite viewing surfaces and an edge, wherein said edge has a first notch configured to align and press fit onto said first wedge and a second notch configured to align and press fit onto said second wedge;
   a locking bar extending across a portion of the viewing card, said locking bar having a first end and a second end, wherein said first end is configured to press fit into said first wedge and a second end is configured to press fit into one of the three lock positions of said second wedge, wherein said locking bar holds said viewing card within the card-loading cavity; and
   an interior viewing surface formed in the interior surface of the food area, the interior viewing surface is aligned with the exterior viewing surface allowing the viewing card to be viewed through the interior viewing surface.

9. The educational dinnerware device of claim 8, wherein the locking bar has two or more protrusions on a surface that contact and press into the viewing card.

10. The educational dinnerware device of claim 8, wherein the locking bar further comprises a handle that extends parallel to the exterior bottom surface.

11. The educational dinnerware device of claim 8 further comprising one or more additional viewing cards placed adjacent to the viewing card within the card-loadinq cavity, wherein the locking bar holds the one or more additional viewing cards within the card-loading cavity.

12. The educational dinnerware device of claim 8 further comprising a protruding ring on the bottom surface that extends from the viewing surface of the card-loadinq cavity and defines a depth of the card-loading cavity.

13. The educational dinnerware device of claim 8, wherein the first wedge and the second wedge each have two parallel nubs spaced apart from each other and each one of the two parallel nubs has a trapezoid shape, where the long side of the trapezoid is formed on the viewing surface of the card-loading cavity and an inside angled side extending from the long side and positioned adjacent and extending away from the other inside angled side of the other one of the two parallel nubs and an outside angled side extending away from the long side on a side of the trapezoid opposite the inside angled side.

14. The educational dinnerware device of claim 13, wherein the first end of the locking bar is pressed in between the inside angled side of each of the two parallel nubs of the first wedge and the second end of the locking bar is press fit onto one of the outside angled sides of the second wedge.

15. An educational dinnerware device comprising:
   a rim;
   an interior surface connected to the rim, wherein the interior surface has at least one interior side wall and a bottom surface defining a food area;
   an exterior surface connected to and extending away from the rim said exterior surface has at least one exterior side wall and an exterior bottom surface;
   a card-loading cavity formed into the exterior bottom surface;
   an exterior viewing surface forming a wall of the card-loading cavity;
   a first wedge formed within said card-loading cavity;
   a second wedge formed within said card-loading, and having an inside angle side and an outside angle side defining three lock positions;
   a third wedge formed within said card-loading cavity, wherein the first wedge, second wedge and third wedge each have two parallel nubs spaced apart from each other and each one of the two parallel nubs has a trapezoid shape, where the long side of the trapezoid is formed on the viewing surface of the card-loading cavity and an inside angled side extending from the long side and positioned adjacent and extending away from the other inside angled side of the other one of the two parallel nubs and an outside angled side extending away from the long side on a side of the trapezoid opposite the inside angled side;
   a viewing card having two opposite viewing surfaces and an edge, wherein said edge has a first notch configured to align and press fit onto said first wedge and a second notch configured to align and press fit onto said second wedge;
   a locking bar extending across a portion of the viewing card, said locking bar having a first end, a second end and a third end, wherein said first end is configured to press fit into said first wedge and a second end is configured to press fit into one of the three lock positions of said second wedge and a third end is configured to press fit into said second wedge, wherein said locking bar holds said viewing card within the card-loading cavity; and an interior viewing surface formed in the interior surface of the food area, the interior viewing surface is aligned with the exterior viewing surface allowing the viewing card to be viewed through the interior viewing surface.

16. The educational dinnerware device of claim 15 further comprising a fourth wedge having two parallel nubs spaced apart from each other and each one of the two parallel nubs has a trapezoid shape, where the long side of the trapezoid is formed on the viewing surface of the card-loading cavity and an inside angled side extending from the long side and positioned adjacent and extending away from the other inside angled side of the other one of the two parallel nubs and an outside angled side extending away from the long side on a side of the trapezoid opposite the inside angled side.

17. The educational dinnerware device of claim 16 wherein the locking bar further comprises a fourth end configured to press fit into said fourth wedge.

\* \* \* \* \*